Dec. 28, 1954  F. P. ALLES ET AL  2,698,239
PHOTOGRAPHIC FILMS
Filed Jan. 20, 1951

FIG. 1.

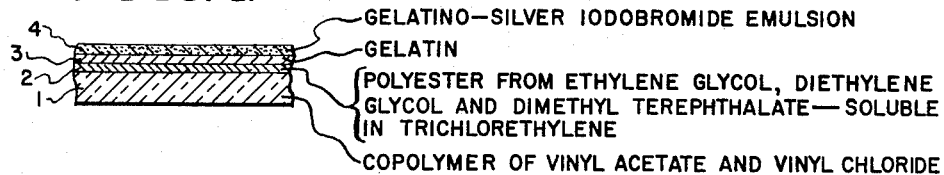

- GELATINO–SILVER IODOBROMIDE EMULSION
- GELATIN
- POLYESTER FROM ETHYLENE GLYCOL, DIETHYLENE GLYCOL AND DIMETHYL TEREPHTHALATE—SOLUBLE IN TRICHLORETHYLENE
- COPOLYMER OF VINYL ACETATE AND VINYL CHLORIDE

FIG. 2.

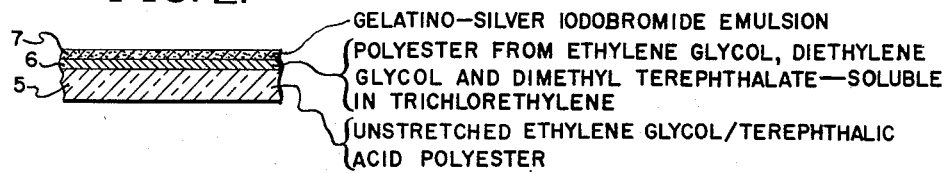

- GELATINO–SILVER IODOBROMIDE EMULSION
- POLYESTER FROM ETHYLENE GLYCOL, DIETHYLENE GLYCOL AND DIMETHYL TEREPHTHALATE—SOLUBLE IN TRICHLORETHYLENE
- UNSTRETCHED ETHYLENE GLYCOL/TEREPHTHALIC ACID POLYESTER

FIG. 3.

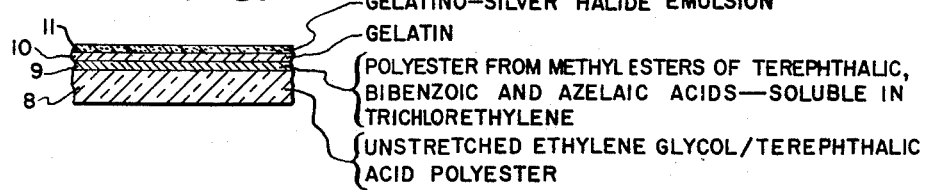

- GELATINO–SILVER HALIDE EMULSION
- GELATIN
- POLYESTER FROM METHYL ESTERS OF TEREPHTHALIC, BIBENZOIC AND AZELAIC ACIDS—SOLUBLE IN TRICHLORETHYLENE
- UNSTRETCHED ETHYLENE GLYCOL/TEREPHTHALIC ACID POLYESTER

FIG. 4.

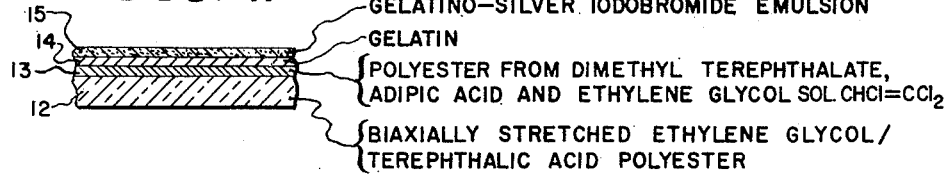

- GELATINO–SILVER IODOBROMIDE EMULSION
- GELATIN
- POLYESTER FROM DIMETHYL TEREPHTHALATE, ADIPIC ACID AND ETHYLENE GLYCOL SOL. $CHCl=CCl_2$
- BIAXIALLY STRETCHED ETHYLENE GLYCOL/TEREPHTHALIC ACID POLYESTER

INVENTORS
FRANCIS PETER ALLES
WILLIAM RUSSELL SANER

BY *Lynn Barratt Morris*

ATTORNEY

United States Patent Office 2,698,239
Patented Dec. 28, 1954

2,698,239

PHOTOGRAPHIC FILMS

Francis Peter Alles, Westfield, and William Russell Saner, Plainfield, N. J., assignors to E. I. du Pont de Nemours & Company, Wilmington, Del., a corporation of Delaware Application January 20, 1951, Serial No. 207,054

9 Claims. (Cl. 95—9)

This invention relates to photographic films and more particularly to such films which have a thin anchoring layer between the film base and a water-permeable layer. Still more particularly it relates to such films wherein the anchoring layer is composed of a polyester of a glycol or glycols and one or more dibasic acids which is soluble in a chlorinated aliphtic hydrocarbon solvent.

In the manufacture of photographic film it is difficult to obtain firm wet and dry anchorage between a photographic film base which necessarily is hydrophobic and a gelatino silver halide emulsion layer. Various resins have been proposed as anchoring substrata but they vary considerably in properties and a resin which is suitable for one type of base does not always give satisfactory results for another type of film base.

An object of this invention is to provide an improved anchoring substratum for photographic films. A further object is to provide such a substratum which has good wet and dry adherence to diverse types of hydrophobic film base. Still further objects will be apparent from the following description of the invention.

It has been found that the highly polymeric polyesters of glycols and terephthalic acid which have a molecular weight of at least 5,000 and are soluble to the extent of at least ½% by weight in trichlorethylene are excellent film-forming polymers for sublayers in photographic films. The resulting new films have numerous advantages. The polyesters have been found to be satisfactory substrata for the adhesion of water-permeable colloids, e. g., gelatin, to hydrophobic film bases including cellulose ester film bases, e. g., cellulose acetate, cellulose propionate, cellulose-acetate-propionate and cellulose-acetate-butyrate; film bases composed of a hydrophobic superpolymer, e. g., the polyamides, polyesters, polyesteramides described in Carothers U. S. Patent No. 2,071,-250, Winfield et al. 2,465,319 and Dickson 2,465,150; polyvinyl chloride, polyvinyl-acetate, vinylchloride/vinylacetate copolymers and other hydrophobic film bases.

The polyesters having the above prescribed solubility characteristics can be applied to the film base from a ½% to 10% solution in a suitable solvent in the same manner that previous resin sublayers have been applied. The layer should be very thin so that the flexibility characteristics of the film will not be impaired. In general, the thickness should be from 0.00005 to 0.0005 inch. After drying, the polyester coated film base can be coated with a thin gelatin subcoat from solvent dispersion containing a solvent or swelling agent for the polyester, e. g., acetone or a volatile chlorinated aliphatic hydrocarbon, e. g., methylene chloride, chloroform, symmetrical dichlorethane, vinylidene chloride, trichlorethylene, carbon tetrachloride, etc. A light-sensitive colloid-silver halide emulsion layer is then coated on the novel sublayer in the usual manner to complete the photographic film.

Polyesters that have a substantial degree of solubility in trichlorethylene which are especially useful as sublayers for photographic films are those made by condensing a mixture of (1) a polymethylene glycol having from 2 to 10 methylene groups and (2) a polyethylene glycol containing from 1 to 5 oxyethylene radicals with terephthalic acid or an acid chloride or acid bromide thereof, or a diester thereof with an alkanol of 1 to 6 carbon atoms. The mol per cent of polyethylene glycol in the polymethylene glycol/polyethylene glycol mixture may vary from 20% to 100%, with a preferred range of 25% to 75%. The polyesterification reaction can be conducted after the manner described in U. S. Patent 2,465,319 at an elevated temperature, e. g., about the boiling point of the glycols until all of the acid has reacted with the glycols which are preferably present in excess. The temperature is then increased and the glycols removed by distillation usually at reduced pressure.

Another group of trichlorethylene-soluble polyesters which can be used as sublayers in another important aspect of the invention are those obtainable by condensing a polymethylene glycol having 2 to 10 methylene groups with a mixture of (1) terephthalic acid or an acid chloride or acid bromide thereof, or a diester thereof with an alkanol of 1 to 6 carbon atoms and (2) a saturated aliphatic dicarboxylic acid of 4 to 16 carbon atoms or an acid chloride or an acid bromide thereof, or a diester thereof with an alkanol of 1 to 6 carbon atoms. Preferred aliphatic dicarboxylic acid compounds are adipic, sebacic acid and azelaic acid and their acid chlorides and bromides, and their dimethyl and diethyl esters. The polyesterification reaction can take place in the same manner described in the preceding paragraph.

In the case of the second specific group of polyesters the polymethylene glycol should be in excess and the terephthalic acid compound should constitute at least 25% of the total acid compound, and the aliphatic dicarboxylic acid compound may constitute from 10% to 75% of the total acid compound. In addition to these two compounds there may also be present from 1% to 25% of another dicarboxylic acid compound which is capable of forming a polyester by a condensation reaction. Among such latter useful compounds are bibenzoic acid, phthalic acid, isophthalic acid and their dimethyl and diethyl esters.

Representative photographic films of the types described above are illustrated in the attached drawing which forms a part of the specification. Referring to the drawing:

Fig. 1 is a schematic cross-sectional view of the film described in Example I,

Fig. 2 is a schematic cross-sectional view of the film described in Example III, Fig. 3 is a schematic cross-sectional view of the film described in Example VIII, and Fig. 4 is a schematic cross-sectional view of the film described in Example XII.

The invention will be further illustrated but is not intended to be limited by the following examples.

Example I

A polyester was prepared by heating dimethyl terephthalate with equal molar amounts of ethylene glycol and diethylene glycol (the glycols being stoichiometrically in excess of the dimethyl terephthalate) at 170–220 degrees C. in the presence of 0.03% by weight of litharge based on the dimethyl terephthalate until evolution of methanol ceased. The temperature was then increased to 250–280 degrees C., and the pressure reduced to 0.1 to 0.5 mm. of mercury. Glycol was evolved as polymerization proceeded. The resulting polymer, after cooling to room temperature, was clear, hard and flexible and had an intrinsic viscosity of 0.80 in 40/60 by weight phenol-tetrachloroethane.

A 1% solution of the above polyester in trichlorethylene was applied by a skim coating technique at 75 inches per minute to a clear film base 1 as shown in Fig. 1 of the drawing composed of the copolymer of vinyl acetate and vinyl chloride (10 parts to 90 parts, by weight). After the thin polyester layer 2 had dried, a gelatin dispersion of the following composition was applied:

| | Per cent |
|---|---|
| Gelatin | 0.8 |
| Acetic acid | 4.0 |
| Methanol | 10.2 |
| Acetone | 85.0 |

A layer of a light-sensitive gelatino-silver iodobromide emulsion (comprising 1.75 mol per cent iodide and the rest bromide) was deposited on the gelatin sublayer 3 and dried. The adhesion of the emulsion layer 4 was found to be excellent. After processing the exposed photographic film in the normal manner, the adhesion, both wet and dry, was still excellent.

Example II

A second film was prepared as in Example I, with the exception that a 3% solution of the polyester of Example I was substituted for the 1% solution of that example. Adhesion was excellent, before and after processing.

Example III

A 3% solution in trichlorethylene of the polyester of Example I was applied to an unstretched ethylene glycol/terephthalic acid polyester film 5 as shown in Fig. 2 of the drawing, said film being of the type described in U. S. application, Serial No. 151,274, filed March 22, 1950 now U. S. Patent Number 2,627,088. After drying, the gelatin dispersion of Example I was applied over the polyester layer and dried thereby forming sublayer 6. A layer 7 of a light-sensitive gelatino-silver iodobromide emulsion of the type described in Example I was applied and the film again dried. The emulsion anchorage was found to be good. After processing the exposed photographic film in the normal manner, the adhesion was still good.

Example IV

Another film was prepared as in Example III, substituting a stretched ethylene glycol/terephthalic acid polyester film (approx. 2 times in both directions) of the type described in U. S. Patent 2,627,088, for the unstretched film of Example III. The emulsion adhesion was the same as that of Example III.

Example V

A 5% solution in trichlorethylene of the polyester of Example I was applied to a cellulose acetate film (55.6% combined acetic acid) after which the film was treated as in Example I. Emulsion adhesion was found to be satisfactory both before and after processing the exposed photographic film in the usual manner.

Example VI

Another film was prepared as in Example I, substituting, for the 1% polyester solution of that example, a 3% solution in trichlorethylene of a polyester prepared by reacting diethylene glycol with dimethyl terephthalate, as outlined in Example I. The polyester was clear, soft and flexible and had an intrinsic viscosity of 0.64 in 40/60 phenol-tetrachloroethane. Emulsion adhesion was found to be satisfactory.

Example VII

Another film was prepared as in Example I, substituting, for the 1% polyester solution of that example, a 3% solution in trichlorethylene of a polyester prepared by reacting a mixture of diethylene glycol and ethylene glycol (75 and 25 mol per cent, respectively) with dimethyl terephthalate as outlined in Example I. The polyester was clear, hard and tough. Emulsion was found to be satisfactory.

Example VIII

A 3% solution in trichlorethylene of the polyester prepared by reacting ethylene glycol with a mixture of the methyl ester of terephthalic, bibenzoic and azelaic acids (40, 20, 40 mol per cent, respectively) was applied to an unstretched ethylene glycol/terephthalic acid polyester film 8 as shown in Fig. 3 of the drawing of the type described in U. S. Patent 2,627,088 to form polyester layer 9. The polyester was cloudy, flexible and tough and had an intrinsic viscosity of 1.29 in 40/60 by weight phenol-tetrachloroethane. After drying, a gelatin dispersion of the following composition was applied:

| | Per cent |
|---|---|
| Gelatin | 1.0 |
| Acetic acid | 4.0 |
| Methanol | 30.0 |
| Trichloroethylene | 65.0 |

To the resulting gelatin sublayer 10, a layer 11 of a light-sensitive gelatino-silver halide emulsion was applied and the film again dried. The emulsion adhesion was satisfactory before and after processing the exposed photographic film in the usual manner.

Example IX

Another film was prepared as in Example VIII, substituting, for the 3% polyester solution of that example, a 3% solution in trichlorethylene of the polyester prepared by reacting ethylene glycol with a mixture of the methyl esters of terephthalic, isophthalic and sebacic acids (50/25/25 mol per cent, respectively) as outlined in Example I. The resin was clear, elastic and tough and had an intrinsic viscosity of 1.12 in 40/60 by weight phenol-tetrachloroethane. Emulsion adhesion was satisfactory before and after processing the exposed photographic film in the usual manner.

Example X

Another film was prepared as in Example VIII, substituting, for the 3% polyester solution of that example, a 3% solution in trichlorethylene of the polyester prepared by reacting ethylene glycol with a mixture of the methyl esters of terephthalic and sebacic acids (50/50 mole percent, respectively) as outlined in Example I. The super polyester was cloudy, elastic and tough and had an intrinsic viscosity of 1.20 in 40/60 by weight phenol-tetrachloroethane. Emulsion adhesion was satisfactory before and after processing the exposed photographic film in the usual manner.

Example XI

Another film was prepared as in Example VIII, substituting for the 3% polyester solution of that example, a 3% solution in trichlorethylene of the polyester prepared by reacting ethylene glycol with a mixture of the methyl esters of terephthalic and sebacic acids (30/70 mole percent, respectively), as outlined in Example I. The resin was cloudy, elastic and tough and had an intrinsic viscosity of 0.94 in 40/60 by weight phenol-tetrachloroethane. Emulsion adhesion was satisfactory before and after processing in the usual manner.

In Examples VIII through XI a mixture of 0.01 to 0.02% by weight each of litharge and $Zn_3B_4O_9$ based on the combined acids may be used as a catalyst.

Example XII

A polyester was prepared, as described in previous examples, by reacting dimethyl terephthalate and adipic acid in equal molar quantities with ethylene glycol (the glycol being stoichiometrically in excess of the dimethyl terephthalate and adipic acid) in the presence of 0.015% by weight based on the dimethyl terephthalate of a $Zn_3B_4O_9$ catalyst. The resulting polyester was clear and slightly rubbery and had an intrinsic viscosity of 0.37 in a mixture of 100 parts of phenol and 70 parts of 2,4,6-trichlorophenol.

An 8% solution of the above polyester in methylene chloride was applied to a clear ethylene glycol/terephthalic acid polyester film 12 as shown in Fig. 4 of the drawing of the type described in United States Patent 2,627,088, which had been stretched 2½ times in one direction and 2 times in the direction at right angles to the first. After the polyester layer 13 had been dried in a current of air at a temperature of 49° C., a gelatin dispersion of the following composition was applied:

| | Per cent |
|---|---|
| Gelatin | 1.0 |
| Acetic acid | 4.0 |
| Methanol | 40.0 |
| Acetone | 55.0 |

A layer of a light-sensitive gelatino-silver iodobromide emulsion (comprising 1.75 mol percent iodide and the rest bromide) was applied to the gelatin sublayer 14 and dried. The adhesion of the emulsion layer 15 was found to be good. After processing in the normal manner, the adhesion both wet and dry was still good.

The photographic films of this invention can be tinted or colored by adding a suitable dye or pigment to the coating composition used to make the film base. Alternatively, the polyester substratum can be colored or tinted by incorporating a suitable dye or pigment in the polyester coating composition. Suitable dyes and pigments for tinting the substrata are described in Scanlan U. S. P. 1,973,886. Opacifying dyes or pigments can be added in like manner to the polyester coating composition.

The polyester subbing solutions of the above examples can be applied to the film base by any of the conventional methods as indicated above, e. g., from a hopper provided with an adjustable outlet. Spreading, beading, dipping, transfer rolls, floating, etc., methods can be used if desired.

The present invention is, of course, not limited to the use of gelatin as the water-permeable or reversible film-forming organic colloid in the sublayer or as a binding agent for the light-sensitive-silver-halides. Suitable additional colloids of this type which are capable of showing high viscosity characteristics and appreciable jelly strength which may be used include proteins and their derivatives, such as glue, casein, zein, albumin, soybean protein, and degraded gelatin; other naturally occurring colloids, such as agar-agar, Irish moss, pectin; cellulose derivatives such as lowly substituted cellulose acetate, cellulose nitrate, and ethyl cellulose; synthetic polymers including polyhexamethylene adipamide and polytriglycol adipamide; polyvinyl alcohol and its derivatives, such as polyvinylacetate, polyvinylchloracetate and polyvinylacetals including polyvinylformal, polyvinylacetal, polyvinylisobutyral and the polyvinylacetals with color-forming aldehydes including those described in U. S. Patents Nos. 2,310,943, 2,320,422 and 2,423,572.

The light-sensitive colloid layer which is coated on the colloid sublayer blends with the sublayer so that the two are substantially homogeneous. The light-sensitive layer or layers which may be deposited on the subbed film base may vary considerably in chemical constitution although they may be simple or mixed silver halides or may be mixtures of various types of silver halide emulsions. Among the useful silver halide emulsions are those made of silver chloride, silver bromide, silver chlorbromide, silver iodobromide, etc.

Various emulsion components such as sensitizing dyes, desensitizers, fog inhibitors, emulsion stabilizers, color formers, light-screening or light-filter dyes and pigments may be present in the emulsion layers. The novel polyester substrata do not have any deleterious effect upon the emulsion components but adhere satisfactorily to the film base and to the colloid layer or layers deposited thereon. In the case of multi-layer color film, of course, there are a plurality of differentially sensitized water-permeable colloid layers carried by the film base.

The novel photographic film elements of this invention which embody the above-described polyester substrata are not restricted to any particular type of photographic film nor to any one purpose. To the contrary, sheets of film or rolls of film for still or motion picture photography or lithography or radiographic purposes, stripping films, etc., are comprehended by the invention.

The photographic films of this invention possess many advantages especially those wherein the main film base or support is composed of a hydrophobic polyester of the type described in Carothers U. S. Patent No. 2,071,250 and Winfield et al. U. S. Patent No. 2,465,319. The polyesters of the latter patent are high melting, difficultly soluble, usually micro-crystalline, cold-drawing, linear, highly polymerized esters of terephthalic acids and glycols of the series $HO(CH_2)_nOH$, where $n$ is an integer within the range of 2 to 10. They are in general characterized by excellent anchorage between the film base and the novel polyester substrata and the water-permeable colloid layers deposited thereon. The films have good flexibility and the colloid layers do not fracture upon repeated flexing. The films are clear and brilliant prior to the application of the emulsion. The novel polyester substrata do not affect the photographic properties of the superimposed emulsion in any way.

As many widely different embodiments of this invention may be made without departing from the spirit and structure thereof, it is to be understood that the invention is not limited to the specific embodiments thereof except as defined in the claims.

What is claimed is:

1. A film base comprising a hydrophobic film bearing on at least one surface thereof a thin layer having a different composition from said film and comprising a highly polymeric tricomponent polyester of terephthalic acid, a polymethylene glycol having from 2 to 10 methylene groups and a compound taken from the group consisting of the polyethylene glycols containing 1 to 5 oxyethylene radicals, the saturated aliphatic dicarboxylic acids of 4 to 16 carbon atoms and their acid chlorides, acid bromides and diesters with an alkanol of 1 to 6 carbon atoms, said polyester being soluble to the extent of at least ½% by weight in trichlorethylene and having a water-permeable colloid layer on the layer of polyester said colloid being taken from the group consisting of water-permeable proteins, cellulose derivatives, polyvinyl alcohol and polyvinyl acetals.

2. A photographic film element comprising a hydrophobic film sheet bearing in order on one surface thereof a thin layer having a different composition from said film and comprising a highly polymeric tricomponent polyester of terephthalic acid, a polymethylene glycol having from 2 to 10 methylene groups and a compound taken from the group consisting of the polyethylene glycols containing 1 to 5 oxyethylene radicals, the saturated aliphatic dicarboxylic acids of 4 to 16 carbon atoms and their acid chlorides, acid bromides and diesters with an alkanol of 1 to 6 carbon atoms said polyester being soluble to the extent of at least ½% by weight in trichlorethylene, a thin layer composed essentially of a water-permeable colloid and a colloid silver halide emulsion layer said colloid being taken from the group consisting of water-permeable proteins, cellulose derivatives, polyvinyl alcohol and polyvinyl acetals.

3. A film element as set forth in claim 2 wherein said polyester is formed from a mixture of a terephthalic acid esterifying agent, a polymethylene glycol having from 2 to 10 methylene groups and a polyethylene glycol containing 1 to 5 oxyethylene groups.

4. A film element as set forth in claim 2 wherein said polyester is formed from a polymethylene glycol having 2 to 10 methylene groups and a mixture of terephthalic acid and a saturated aliphatic dicarboxylic acid of 4 to 16 carbon atoms.

5. A photographic film element comprising a hydrophobic film sheet bearing in order on one surface thereof a thin layer having a different composition from said film and comprising a highly polymeric tricomponent polyester of terephthalic acid, a polymethylene glycol having from 2 to 10 methylene groups and a compound taken from the group consisting of the polyethylene glycols containing 1 to 5 oxyethylene radicals, the saturated aliphatic dicarboxylic acids of 4 to 16 carbon atoms and their acid chlorides, acid bromides and diesters with an alkanol of 1 to 6 carbon atoms, said polyester being soluble to the extent of at least ½% by weight in trichlorethylene, a thin layer composed essentially of gelatin and a gelatino silver halide emulsion layer.

6. A film element as set forth in claim 5 wherein said polyester is formed from a mixture of a terephthalic acid esterifying agent, a polymethylene glycol having from 2 to 10 methylene groups and a polyethylene glycol containing 1 to 5 oxyethylene groups.

7. A film element as set forth in claim 5 wherein said polyester is formed from a polymethylene glycol having 2 to 10 methylene groups and a mixture of a terephthalic acid esterifying agent and a saturated aliphatic dicarboxylic acid of 4 to 16 carbon atoms.

8. A photographic film element as set forth in claim 7 wherein said film sheet is composed of a hydrophobic polyester.

9. A photographic film element as set forth in claim 7 wherein said film sheet is composed of a hydrophobic cellulose ester.

References Cited in the file of this patent

UNITED STATES PATENTS

| Number | Name | Date |
|---|---|---|
| 1,714,173 | Kessler et al. | May 21, 1929 |
| 2,096,616 | Nadeau | Oct. 19, 1937 |
| 2,096,675 | Babcock | Oct. 19, 1937 |
| 2,465,319 | Winfield et al. | Mar. 22, 1949 |
| 2,497,376 | Swallow et al. | Feb. 14, 1950 |
| 2,585,596 | Stanton | Feb. 12, 1952 |

FOREIGN PATENTS

| Number | Country | Date |
|---|---|---|
| 588,833 | Great Britain | June 4, 1947 |
| 642,505 | Great Britain | Sept. 6, 1950 |